United States Patent
Barbeau et al.

(10) Patent No.: US 8,204,798 B1
(45) Date of Patent: Jun. 19, 2012

(54) METHOD AND SYSTEM FOR INTEGRATING IMAGE-PRINTING AND COMMUNICATION SERVICE IN A SUBSCRIBER SERVICE PLAN

(75) Inventors: Pierre Barbeau, Leawood, KS (US); Yat-Sang Hung, San Diego, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 2853 days.

(21) Appl. No.: 10/951,938

(22) Filed: Sep. 28, 2004

(51) Int. Cl.
*G06Q 30/00* (2012.01)
*G06Q 10/00* (2012.01)
(52) U.S. Cl. ........................ 705/26.8; 705/1.1
(58) Field of Classification Search ............... 705/1, 1.1, 705/26.8, 500
See application file for complete search history.

(56) References Cited

U.S. PATENT DOCUMENTS

| | | | |
|---|---|---|---|
| 7,111,317 B1* | 9/2006 | McIntyre et al. | 725/105 |
| 2004/0171371 A1* | 9/2004 | Paul | 455/414.4 |
| 2005/0131767 A1* | 6/2005 | Heins | 705/26 |
| 2005/0173362 A1* | 8/2005 | Squitieri et al. | 211/187 |
| 2006/0053064 A1* | 3/2006 | Bornstein et al. | 705/26 |
| 2009/0119185 A1* | 5/2009 | Heins | 705/26 |

OTHER PUBLICATIONS

North Shore Alarms & Telecom (Aug. 25, 2008) and TELUS Communications Company, Feb. 18, 2004 and Nov. 26, 2003), Combined PDF Document.*
North Shore Alarms & Telecom—Cellular Products Start Page (Aug. 2004). (www.nsat.com/wireless/).

* cited by examiner

*Primary Examiner* — Jami A Plucinski
*Assistant Examiner* — Michael Thompson (57) ABSTRACT

A method and system for integrating imaging printing and communication service in a subscriber service plan. A service provider, such as a wireless carrier, will establish for a subscriber an integrated service plan that entitles the subscriber to engage in a designated quantity of communications on a recurring time period basis, such as monthly, and to also have a designated quantity of images printed on the recurring time period basis, for a designated fee. The integrated service plan will then be used as a basis to authorize communication service to the subscriber and further as a basis to authorize image prints requested by the subscriber.

22 Claims, 6 Drawing Sheets

METHOD AND SYSTEM FOR INTEGRATING IMAGE-PRINTING AND COMMUNICATION SERVICE IN A SUBSCRIBER SERVICE PLAN

FIELD OF THE INVENTION

The present invention relates to telecommunications and digital photography and, more particularly, to providing image-printing and communication services to subscribers.

BACKGROUND

In the existing art, when a user signs up for communication service, the service provider will typically present the user with a palette of service plans from which to chose, where each service plan is keyed to a quantity of communication service. By way of example, when a user signs up for basic cellular telephone service, the wireless carrier will typically offer the user a number of service plans, each allowing the user to engage in a certain number of minutes (or an unlimited number of minutes) of voice calls per month for designated fee. As another example, when a user signs up for data communication service, the service provider may offer the user a number of service plans, each allowing the user to engage in a certain number of minutes (or an unlimited number of minutes) of data communication per month for a designated fee or to communicate a certain quantity of data (or an unlimited quantity of data), such as a certain number of messages, packets, or bytes, per month for a "designated fee.

With the widespread popularity of digital photography, it is also separately known today for users to capture digital images, and to provide those images to photo processing labs for printing. Using a camera phone or other wirelessly-equipped digital camera, for instance, a user can capture an image and then readily transmit the resulting image file over a network to a photo processing lab. Alternatively, the user can bring the camera or a memory card containing the image file to a photo processing lab (e.g., a photo counter at a store, or a print-kiosk) and can convey the image file to the photo processing lab. After receipt of the image file, the photo processing lab (or an associated entity) can then print the image and deliver the printed copy to the user or to another designated party.

SUMMARY

The present invention provides a method and system for integrating image-printing and communication service in a subscriber service plan. According to the invention, a telecommunication service provider will provide a subscriber with a service plan that allows the subscriber, for a designated fee on a monthly or other recurring basis, (i) to engage in a quantity of communication service and (ii) to have a certain number of images printed. For convenience in this description, this integrated subscriber service plan will be referred to as a "Communication Service and Image Printing" (CSIP) plan. The plan may allow for other services as well.

The communication service component of the CSIP plan will preferably allow the subscriber to engage in up to a designated quantity of communications in each recurrent time period (e.g., monthly). The designated quantity can be a finite quantity, such as a number of minutes, number of messages, number of calls, quantity of data, or the like. Alternatively, the designated quantity can be an infinite quantity, i.e., an unlimited quantity. Further, the allowed communications can be one or more types of communications, such as telephone calling (e.g., voice calling), group conferencing, data communications (e.g., Internet access), instant messaging, short message service (SMS) messaging, multimedia messaging service (MMS) messaging, or the like.

The image-printing component of the CSIP plan will preferably allow the subscriber to have up to a designated number of images printed at any participating and/or designated photo processing lab(s) in each recurrent time period. In this regard, a participating photo processing lab can have an online presence through which it can receive the subscriber's image files for printing, and it can have a "brick-and-mortar" presence (such as a building, kiosk, and/or other tangible facility) at which it can print the images for the subscriber. Alternatively, the participating photo processing lab can have just a brick-and-mortar presence, such as a walk-in photo processing center, a kiosk, or other tangible facility.

Further, the subscriber can convey image files to the participating photo processing lab in any of a variety of ways, to facilitate image-printing. By way of example, the subscriber can convey image files to the participating photo processing lab by landline and/or wireless transmission, over a direct and/or networked communication path, from the subscriber's digital camera, memory card, and/or other device, through mail or courier delivery, or by some other means. Alternatively, the subscriber can provide images to the participating photo processing lab in the form of photographic film (to be developed), negatives (to be scanned or used for traditional printing), or previously printed photos (to be scanned or otherwise captured for re-printing). Still alternatively, the photo processing lab itself may capture an image to be printed, such as by taking a photo (e.g., a family portrait or passport photo) for the subscriber.

In a preferred embodiment of the invention, the service provider will charge a designated fee for the CSIP plan in each recurrent time period. The fee can be a base fee for the allowed quantities of communications and image-printing in the recurrent time period. Further, the service provider can charge an overage fee for communications and image-printing that extend beyond the allowed quantities in the recurrent time period. By way of example, the service provider can charge a monthly fee of $45.00 for the combination of (i) 400 minutes of voice calling, (ii) unlimited Web browsing and messaging, and (iii) 15 image prints at participating photo processing labs, plus a fee of $0.40 for each additional image print beyond the base 15 prints. Other examples are possible as well.

In practice, the service provider will preferably enter into a contract with the subscriber, through which the subscriber will agree to pay the designated fee each month for the designated quantities of communications and image-printing. The service provider will then store a record of the subscriber's CSIP plan in a network-based data storage medium, which could be centralized, distributed and/or replicated. The record of the subscriber's CSIP plan will preferably include data that indicates (i) a subscriber ID, such as a username, device identifier, network access identifier (NAI), or the like, (ii) the quantities of communications and image-printing allotted to the subscriber for each recurrent time period, and (iii) the recurring fee that the subscriber agreed to pay for the service. In addition, the record will preferably include data that indicates the number of unused image-printing allowances, if any, remaining for the subscriber in the present time period.

During or for each recurrent time period, the service provider or an associated entity will then apply the subscriber's CSIP plan to authorize and/or bill the subscriber for communications and image-printing. For example, before allowing each instance of communication, the service provider or an associated entity may refer to the subscriber's CSIP plan to determine whether the communication is allowed. Further, as the communication occurs and/or after the communication is finished, the service provider may generate one or more billing records to facilitate accounting and billing the subscriber, if appropriate, according to the subscriber's CSIP plan. In addition, before allowing image-printing for the subscriber at a participating photo processing lab, the service provider, the photo processing lab, or an associated entity may refer to the subscriber's CSIP plan to determine whether the image print is allowed, such as whether the CSIP plan includes a sufficient number of as yet unused image-printing allowances. Further, upon authorizing or carrying out the image-printing, the service provider, photo processing lab, or associated entity may then update the subscriber's CSIP plan to account for the image-printing, such as to indicate how many image-printing allowances remain in the CSIP plan.

These and other aspects, advantages, and alternatives will become more apparent to those of ordinary skill in the art by reading the following detailed description, with reference where appropriate to the accompanying drawings. Further, it should be understood that the foregoing summary is merely exemplary and is not intended to limit the scope of the invention as claimed.

DETAILED DESCRIPTION OF AN EXEMPLARY EMBODIMENT

Figure 1:
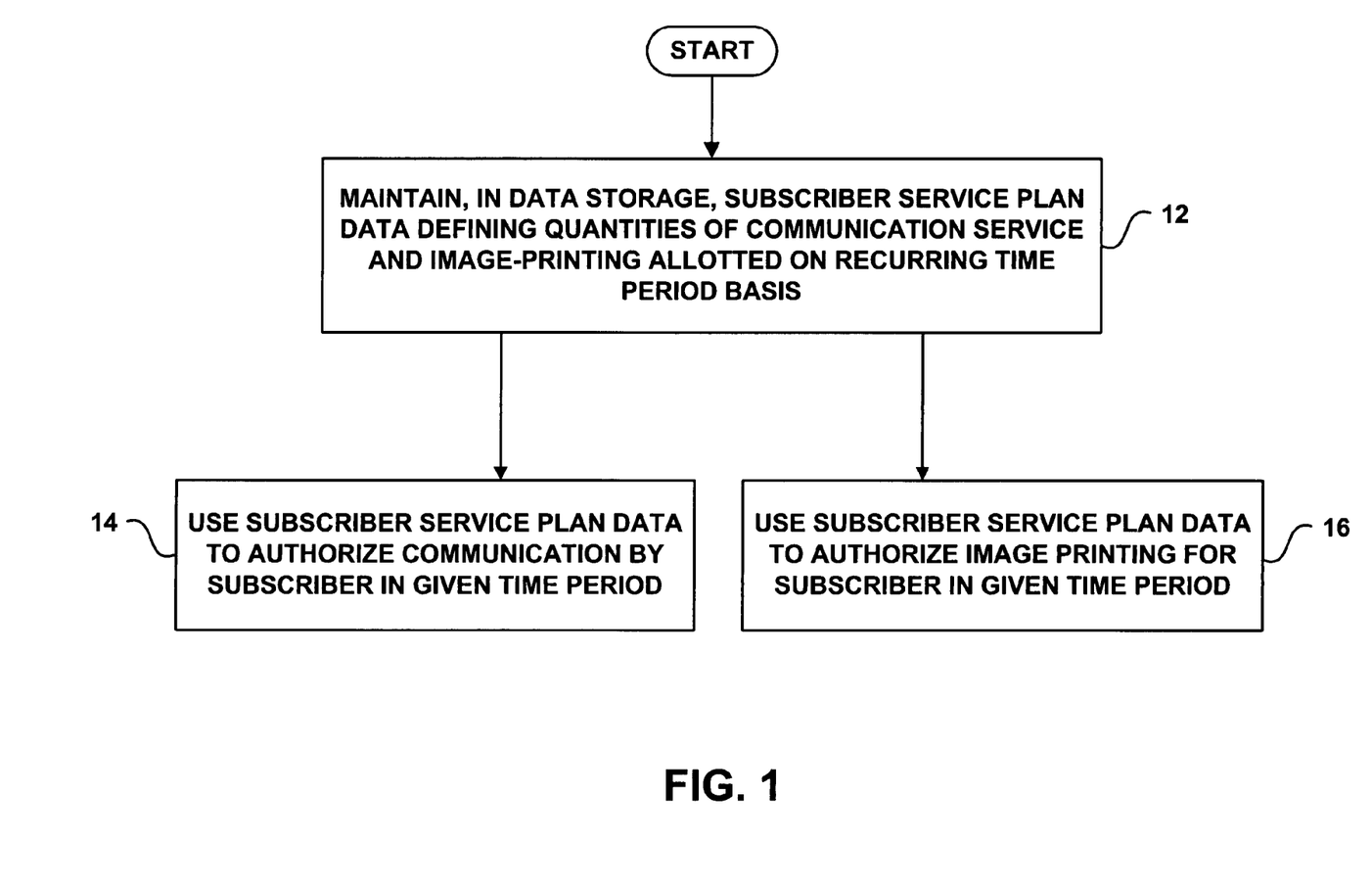
FIG. 1 is a flow chart depicting functions carried out in accordance with an exemplary embodiment of the invention.

Referring to the drawings, FIG. 1 is a flow chart depicting a method arranged in accordance with an exemplary embodiment of the invention. As shown in FIG. 1, at block 12, the method involves maintaining in data storage a set of subscriber service plan data that defines a quantity of communication service allotted to a subscriber on a recurring time period basis and a quantity of image-printing allotted to the subscriber on the recurring time period basis. At block 14, the method then involves using the subscriber service plan data to authorize communication by (e.g., to or from) the subscriber in a given time period. Further, at block 16, the method involves using the subscriber service plan data to authorize image-printing for the subscriber in the given time period.

To facilitate implementation of the invention in practice, a service provider or other entity will initially establish a CSIP plan respectively for each of a plurality of subscribers and will store an indication of each subscriber's CSIP plan in data storage for later reference. The CSIP plan will preferably specify both a quantity of communication service that the subscriber is authorized to use per recurring time period and a quantity of image prints that the subscriber is authorized to obtain per recurring time period, possibly among other allowances as well. The recurring time period may be monthly, bi-monthly, weekly, annually, or any other agreed period of time.

Preferably, a service provider will enter into a contract with each subscriber, through which the subscriber will agree to pay a fee for a combination of services including at least the designated quantities of communication service and image-printing per month. As noted above, the contract may specify a base fee for the subscriber to pay per month and may further specify one or more overage charges for the subscriber to pay for service beyond the designated quantities. For instance, the contract may specify a base fee per month for service that includes designated quantities of communications and image-printing and may further specify an overage charge for each additional image-print beyond the designated quantity of image prints per month.

The service provider may maintain subscriber CSIP plans in data storage in any of a variety of ways. In a preferred embodiment, for instance, the service provider can maintain a first set of data that generally defines various service plans, such as plans "A", "B", "C" and so forth, and that specifies for each service plan a respective quantity of communication service, a respective quantity of image-printing per month, and a respective monthly fee. When a subscriber contracts for service, the subscriber may then select one of the generally defined service plans, and the service provider may record an indication of the selected service plan in a service profile record for the subscriber. Thus, one subscriber's profile may indicate that the subscriber subscribes to plan "A" (and thus has a particular allotment of communication service and image-printing per month), while another subscriber's profile may indicate that the subscriber subscribes to plan "B" (and thus has a different allotment of communication service and image-printing per month). Alternatively, subscriber service profiles themselves may expressly state allotted quantities of communication service and image-printing per month.

Each subscriber will preferably have a respective subscriber ID, such as a username, device identifier, or NAI, to which the subscriber's CSIP plan will be keyed. In some cases, the subscriber ID can be a general account-identifier that identifies an account with which multiple users and/or devices are associated. Thus, multiple users and/or devices may share a common account and thus a common CSIP plan. In other cases, the subscriber ID may be associated with just a single user and/or device.

Each subscriber's stored CSIP plan may thus include data that indicates, expressly or by reference to other data, (i) a subscriber ID, (ii) the quantities (finite or unlimited) of communications and image-printing allotted to the subscriber for each recurrent time period, and (iii) the recurring fee that the subscriber agreed to pay for the service. Further, at least one stored copy of the subscriber's CSIP plan will preferably include data that indicates the number of unused image-printing allowances, if any, remaining for the subscriber in the current month. For instance, if the subscriber has an allowance of 20 image-prints per month and the subscriber has used 11 of the image-printing allowances so far in the month, then the subscriber's CSIP plan may indicate that the subscriber has 9 image-printing allowances left for the month.

As noted above, the service provider may store a record of each subscriber's CSIP plan in a network-based data storage medium, which can be centralized, distributed and/or replicated. In a preferred embodiment, for instance, the service provider will maintain a centralized record of the subscriber's CSIP plan and will further distribute copies of the CSIP plan (in whole or in part) to various nodes throughout a network, so as to facilitate convenient reference to the CSIP plan as the subscriber seeks to engage in communication service or have images printed. In practice, the service provider and/or another entity will then refer to the subscriber's CSIPO plan as a basis to authorize and/or bill for communication service and image-printing.

To facilitate use of the subscriber's CSIP plan as a basis to authorize communication services, at least a portion of the CSIP plan data will preferably be stored at or accessible by a network node that sits within the subscriber's communication path or that governs communications over that path. When a communication to or from the subscriber is attempted through that communication path, the node can then query the CSIP plan data to determine whether to allow the communication to proceed.

Figure 2:
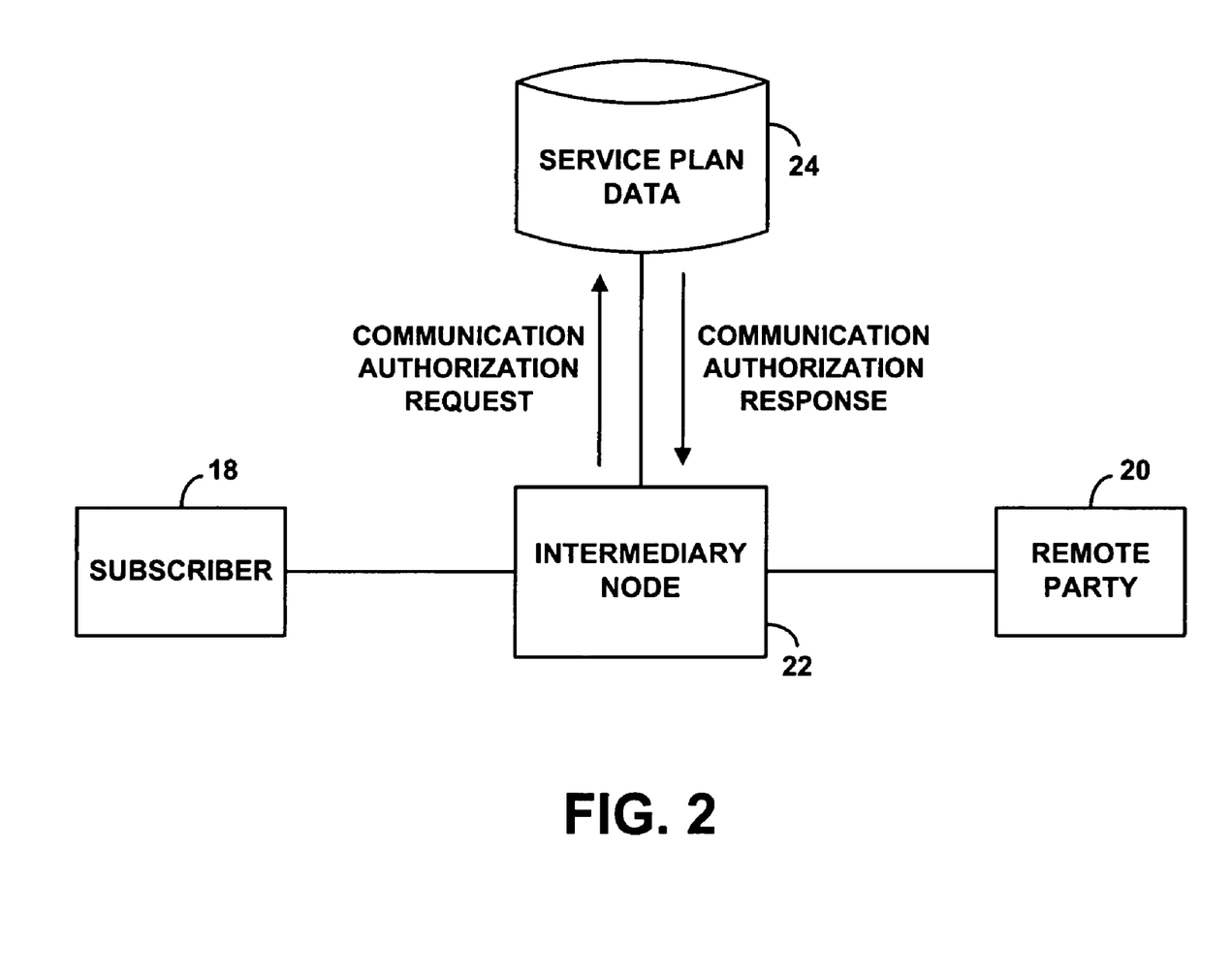
FIG. 2 is a block diagram depicting use of a subscriber's CSIP plan by a communication intermediary to authorize communication service.

This arrangement and functionality is generally illustrated by FIG. 2, which illustrates a communication path (e.g., network) between a subscriber 18 (user and/or device) and a remote party 20. Sitting within the communication path is a node 22, such as a switch, gateway, home agent, proxy server, or the like, which includes or is in communication with a data storage function (e.g., a database server, or simply data storage) 24. The data storage function in turn includes at least a portion of the CSIP plan data for subscriber 18, indicating one or more communication services to which the subscriber subscribes. For instance, the service plan data for subscriber 18 may indicate that the subscriber is entitled to engage in an unlimited quantity of data communications or voice communications.

With this arrangement, when a communication is attempted through node 22, node 22 may refer to the subscriber's CSIP plan data to determine whether the communication should be allowed, and node 22 may allow the communication to proceed if the subscriber's CSIP plan data authorizes it. For instance, node 22 may itself read the CSIP plan data to determine whether the plan authorizes the attempted communication, or node 22 may send a query signal to data storage function 24 and receive a response back indicating whether the subscriber's CSIP plan authorizes the attempted communication.

Quantity restrictions may or may not be used as a basis to authorize communications. In one arrangement, for instance, if the subscriber's CSIP plan limits the subscriber to a finite quantity of communications per month, node 22 may track usage and block further communications once that finite quantity is exhausted. In another arrangement, however, even if the subscriber has used up the allotted finite quantity of communications for the month, node 22 may still authorize the communication to proceed, but the subscriber may then pay overage charges for additional communication.

Figure 3:
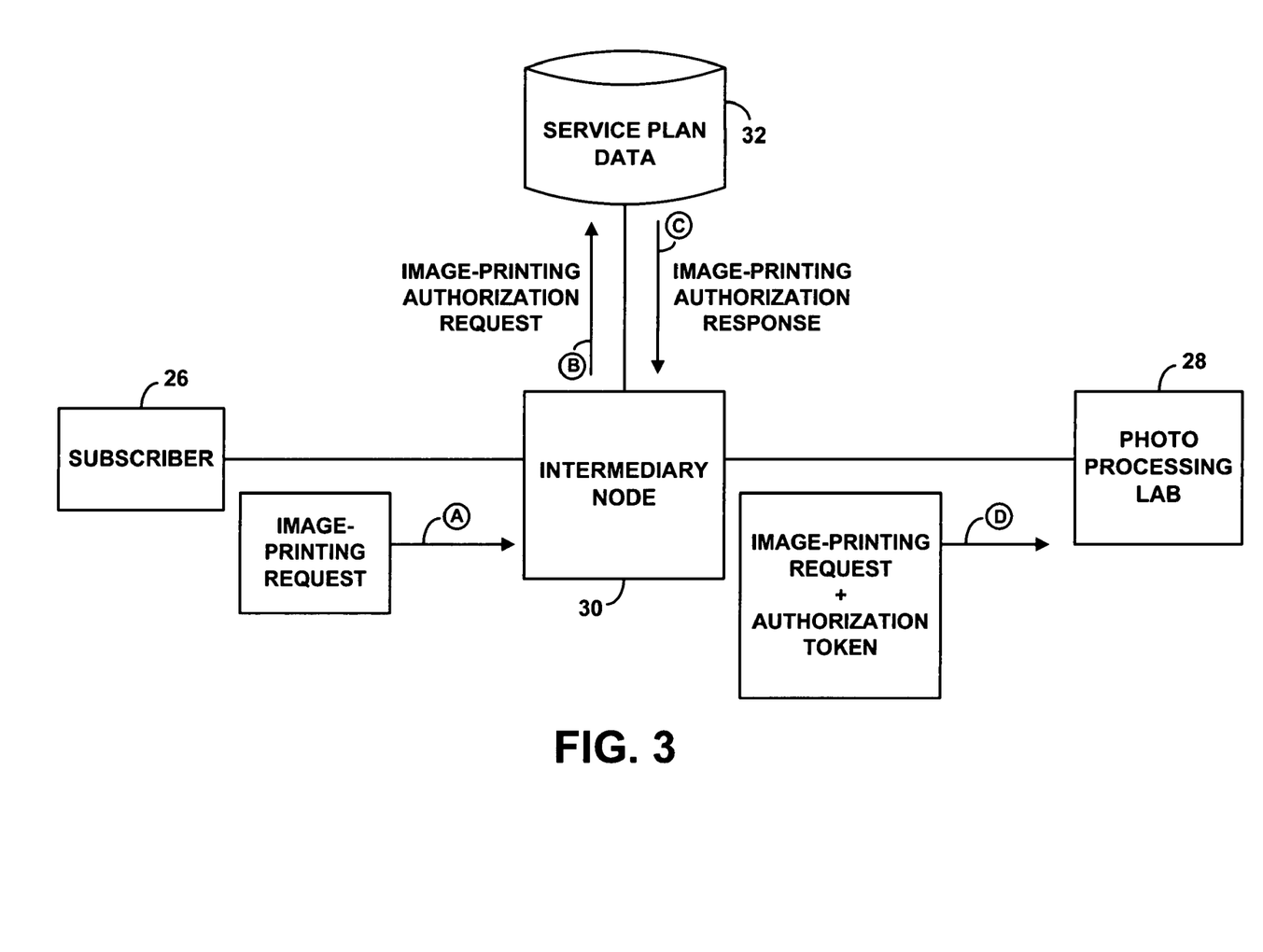
FIG. 3 is a block diagram depicting use of a subscriber's CSIP plan by a communication intermediary to authorize image-printing.
Figure 4:
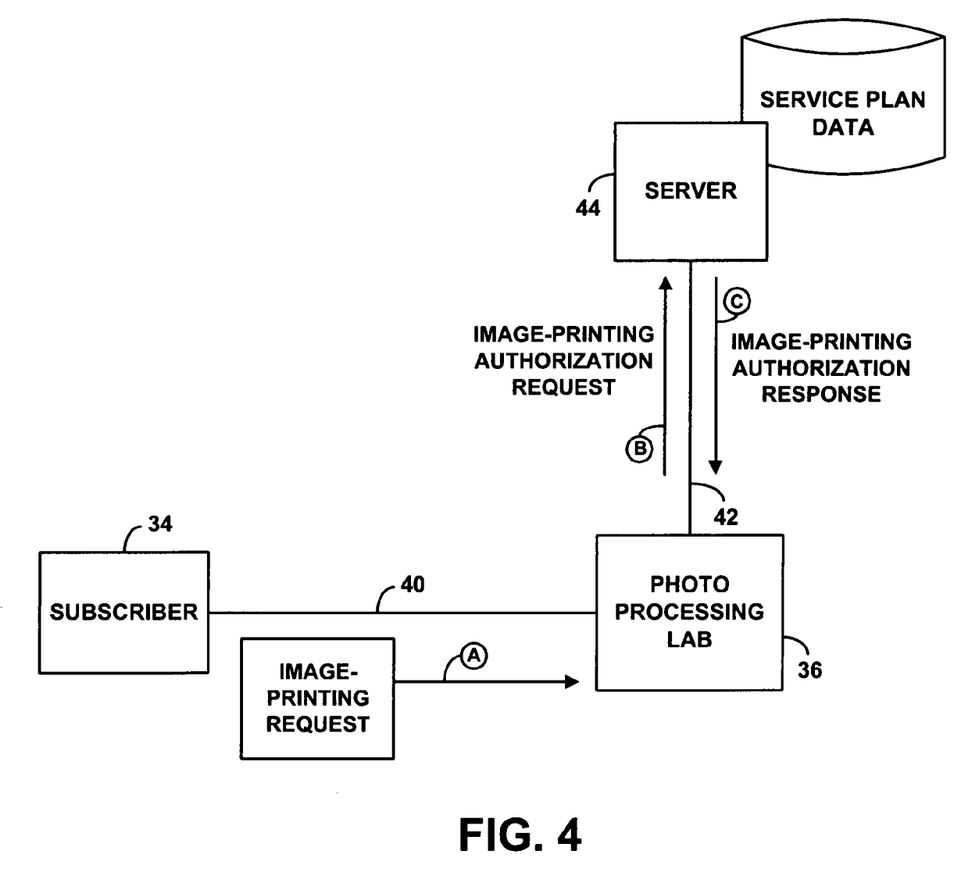
FIG. 4 is a block diagram depicting use of a subscriber's CSIP plan to authorize image-printing in response to a query from a photo processing lab.
Figure 5:
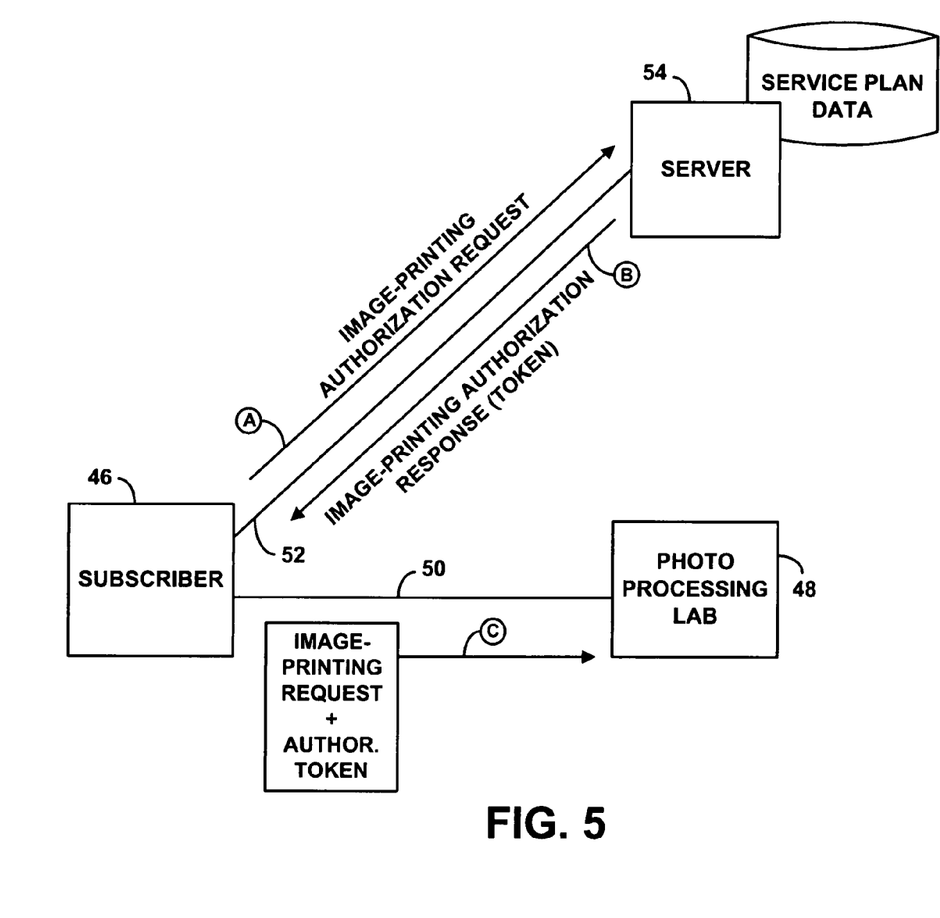
FIG. 5 is a block diagram depicting use of a subscriber's CSIP plan to authorize image-printing in response to a query from a subscriber station.

To facilitate use of the subscriber's CSIP plan as a basis to authorize image-printing, on the other hand, at least a portion of the CSIP plan data will be stored at a network location that can be queried when the subscriber seeks to obtain one or more image prints, in order to authorize the image-printing. Depending on how the subscriber seeks to obtain the image prints, this authorization process can work in various ways, and the CSIP plan data could be stored in various locations. FIGS. 3-5 illustrate three example authorization scenarios.

In the arrangement of FIG. 3, a subscriber 26 conveys an image-printing request over a network communication path to a photo processing lab 28, seeking to have the photo processing lab print a designated number of images conveyed with the request or previously uploaded. In this arrangement, a network node 30, such as a switch, gateway, or proxy server, for instance, similarly sits within the communication path, and so the image-printing request being transmitted from the subscriber to the photo processing lab passes through the node 30. Node 30 is preferably maintained by the service provider that provides the subscriber with communication service and may in fact be the same as node 22 of FIG. 2

Node 30 includes or is in communication with a data storage function 32 that contains at least a portion of the subscriber's CSIP plan data, indicating a quantity of image prints that the subscriber is entitled to obtain. The CSIP plan data may, for instance, indicate the total number of image prints that the subscriber is allowed to obtain per month and the number of image prints that the subscriber has obtained so far in the month, thereby indicating how many (if any) unused image-printing allowances remain for the subscriber in the month. Or the CSIP plan data may specify just the number of remaining image-printing allowances for the month or may take some other form.

In this arrangement, when the image-printing request arrives at node 30, node 30 may refer to the subscriber's CSIP plan data (keyed to a subscriber ID indicated by the image-printing request, for instance) to determine whether the image-printing request should be granted and, if so, may pass the image-printing request together with an authorization token along to the photo processing lab. That way, when the photo processing lab receives the image-printing request, the photo processing lab can use the authorization token as a basis to conclude that the subscriber has paid (or will pay) for or is otherwise authorized to obtain the requested image print(s). The photo processing lab can then print the image(s) and deliver the printed image(s) to the subscriber or another designated party.

Node 30 may itself refer to the subscriber's CSIP plan data to determine whether a sufficient number of unused image-printing allowances exist for the subscriber in the current month. In that case, node 30 itself may generate and supply the authorization token to transmit together with the image-printing request to the photo processing lab. Alternatively, node 30 may query the data storage function 32 and then receive a response indicating whether the subscriber's service plan authorizes the requested image print(s) and, if so, providing node 30 with an authorization token to send along with the image-printing request to the photo processing lab. The authorization token can take any form, such as a predefined code, whether or not encrypted.

As an alternative embodiment, the photo processing lab could be arranged to treat any image-printing request that passed successfully through node 30 as an authorized request, with or without an authorization token being provided. Thus, if node 30 determines or is told that the subscriber's CSIP plan includes a sufficient number of unused image-printing allowances to cover the image-printing request, node 30 may send the image-printing request along to the photo processing lab without also providing an authorization token, and the photo processing lab may consider the image-printing request to be authorized.

In the arrangement of FIG. 4, a subscriber 34 provides an image-printing request to a photo processing lab 36, with or without the request passing through a network communication path such as the path shown in FIG. 3. FIG. 4 generally depicts a communication path 40 between the subscriber 34 and the photo processing lab 36, which represents any path or mechanism through which the subscriber can convey an image-printing request (e.g., with one or more image files to be printed) to the photo processing lab. For example, communication path 40 may represent hand delivery from the subscriber to the photo processing lab of a memory card or the like containing one or more image files for printing. As another example, communication path 40 may represent direct or network communication, whether wired and/or wireless, from the subscriber to the photo processing lab of one or more image files for printing.

FIG. 4 further illustrates another communication path 42, this one extending between the photo processing lab 36 and a server 44 that includes or has access to at least a portion of the subscriber's CSIP plan data, indicating a quantity of image prints that the subscriber is entitled to obtain. In a preferred embodiment, server 44 is maintained by the service provider that provides the subscriber with communication service. For instance, server 44 may be the same as node 30 and/or node 22 described above. The service provider preferably makes server 44 available for communication with photo processing lab 36 over path 42 through a secure Internet connection (e.g., a VPN), at a predefined IP address for instance.

With this arrangement, when photo processing lab 36 receives the image-printing request from subscriber 34, photo processing lab 36 may send an authorization request to server 44, seeking authorization to grant the image-printing request, i.e., to print the requested number of image(s). In a preferred embodiment, the photo processing lab would receive with the image-printing request from the subscriber a subscriber ID (and password, if applicable), and the photo processing lab would convey the subscriber ID (and password) together with the authorization request to server 40. Server 44 may then refer to the subscriber's CSIP plan data (keyed to the subscriber ID) to determine whether the CSIP plan includes a sufficient number of unused image-printing allowances for the month. If so, server 44 may then return a positive authorization response to the photo processing lab, and the photo processing lab may then make and deliver the prints as requested.

Alternatively, the photo processing lab itself may query the subscriber's CSIP plan data to determine whether a sufficient number of unused image-printing allowances exists for the month. And if so, the photo processing lab may then grant the image-printing request.

In the arrangement of FIG. 5, a subscriber 46 conveys an image-printing request to photo processing lab 48 and, while submitting the request, the subscriber obtains image-printing authorization from the service provider and conveys the authorization to the photo processing lab.

More particularly, FIG. 5 depicts a first communication path 50 between the subscriber 46 and the photo processing lab 48, and a second communication path 52 between the subscriber and a server 54 maintained by the service provider. Like server 44 of FIG. 4, server 54 includes or has access to at least a portion of the subscriber's CSIP plan data, indicating a quantity of image prints that the subscriber is entitled to obtain, and server 52 may in fact be the same as node 30 and/or node 22 as described above.

With this arrangement, when subscriber 46 is going to present an image-printing request to photo processing lab, subscriber 46 may transmit an authorization request over path 52 to server 54, providing server 54 with the subscriber ID (and password, if applicable) and an indication of the number of image prints requested. Server 54 may then query the subscriber's CSIP plan data to determine whether a sufficient number of unused image-printing allowances remain for the subscriber in the current month and, if so, may return to the subscriber an authorization response providing an authorization token. Subscriber 46 may then transmit or otherwise provide the image-printing request, together with the authorization token, to the photo processing lab, via path 50. The photo processing lab may then treat the authorization token as an indication that the image-printing request is authorized and may thus print and deliver the image(s) as requested.

To help prevent misuse of this process, server 54 may generate the authorization token as an encryption of information specific to the authorization request. For instance, server 54 may encrypt a combination of (i) a predefined authorization code, (ii) an indication of the number of image prints authorized, (iii) the subscriber ID, and (iv) a timestamp, and server 54 may provide the resulting value as an authorization token to the subscriber 46. When the subscriber conveys the authorization token to the photo processing lab 48, the photo processing lab 48 may then decrypt the token (using a decryption key provided in advance by the service provider, for instance) and may use the decrypted contents to verify that the authorization token is being provided by the correct subscriber, at the correct time, and to authorize the correct number of image prints.

The arrangement of FIG. 5 can apply, by way of example, in a scenario where a user employs a wireless handheld device (e.g., a cell phone or wirelessly-equipped PDA) to submit the image-printing request, i.e., in an "m-wallet" or "e-wallet" type transaction. As part of that transaction, the user's wireless handheld device may wirelessly transmit its authorization request via a radio access network and packet-switched network to server 54, and may receive the authorization response from server 54. The handheld device may then transmit the authorization token locally (e.g., through a BLUETOOTH or WI-FI transmission mechanism) to the photo processing lab, as an indication that the subscriber is authorized to obtain the requested image print(s).

In each of the arrangements of FIGS. 3-5, the assumption is that the subscriber's CSIP plan data indicates a number of image-printing allowances, if any, that remain for the subscriber in the current month. To support this in practice, the subscriber's CSIP plan data will preferably be updated each time image prints for the subscriber are successfully authorized, each time prints are successfully made and delivered to the subscriber, or at another suitable time.

By way of example, in the arrangement of FIG. 3, each time node 30 successfully authorizes a number of image prints for subscriber 26, node 30 may update the subscriber's CSIP plan data to decrement the number of image-printing allowances remaining in the month. Alternatively, each time photo processing lab 28 successfully prints and delivers a number of images for subscriber 26, photo processing lab 28 may send an update signal to node 30, to cause node 30 to then update the subscriber's CSIP plan data to decrement the number of image-printing allowances remaining in the month.

As another example, in the arrangement of FIG. 4, each time server 44 successfully authorizes a number of image prints for subscriber 34, server 44 may update the subscriber's CSIP plan data to decrement the number of remaining image-printing allowances. Alternatively, each time photo processing lab 36 successfully prints and delivers a number of images for subscriber 34, photo processing lab 36 may send an update signal to server 44, to cause server 44 to then update the subscriber's CSIP plan data to decrement the number of remaining image-printing allowances.

Further, while each of the above arrangements assumes that authorization is contingent on there being a sufficient number of unused image-printing allowances for the subscriber, authorization can instead be conditioned simply on the subscriber having subscribed to image-printing service, regardless of the number of remaining image-printing allowances, if any. In that case, if the subscriber exceeds the number of image-printing allowances for the month, then overage charges may begin to apply for each additional image print made for the subscriber.

Figure 6:
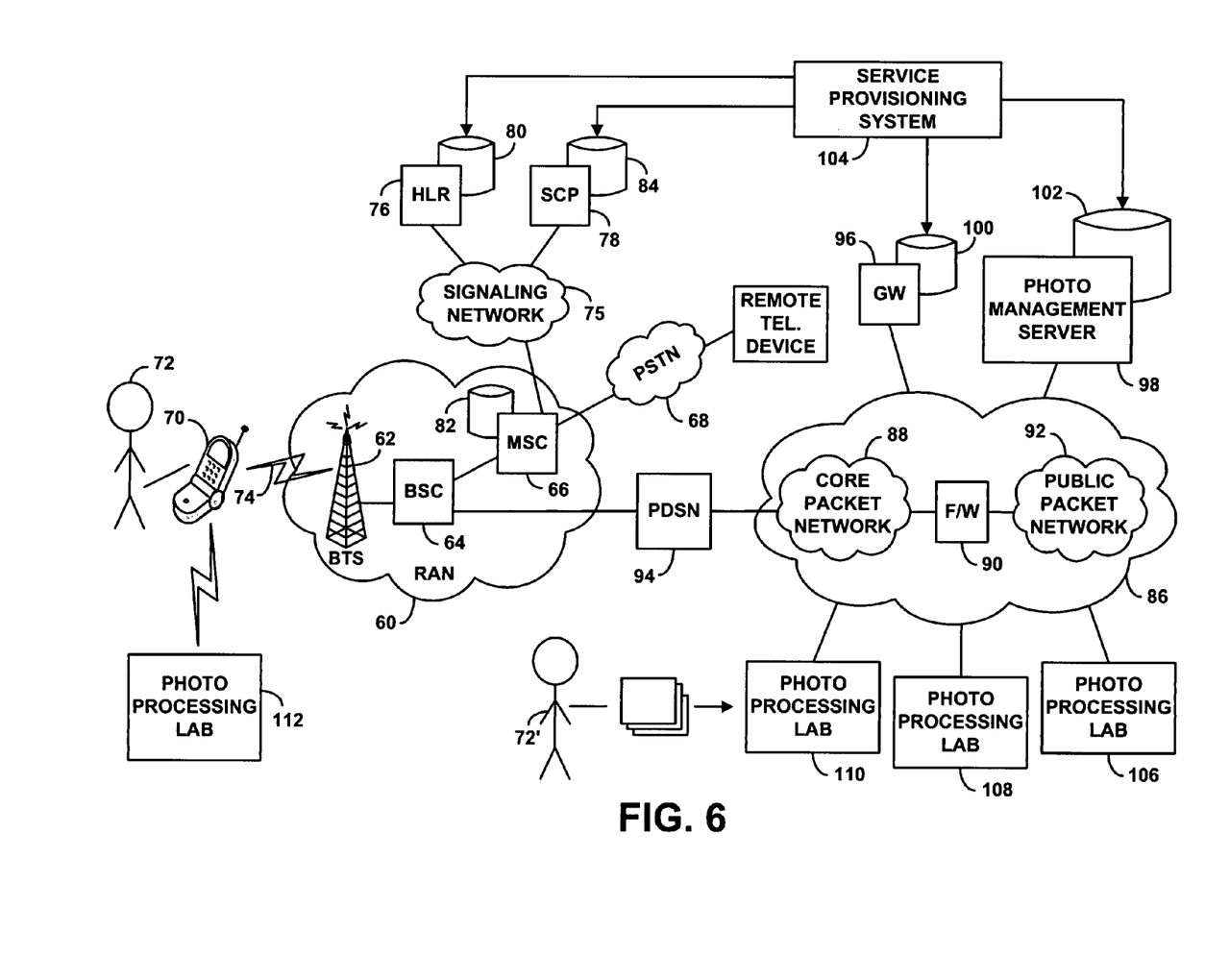
FIG. 6 is a block diagram of an example communication system in which the exemplary embodiment can be carried out.

The arrangements shown in FIGS. 2-5 are generally representative of network arrangements in which the invention can be carried out. Referring now to FIG. 6, a preferred arrangement is shown. In this arrangement, the service provider is a wireless carrier that provides a wireless access channel through which subscribers can communicate. In accordance with the exemplary embodiment, the wireless carrier will provide its subscribers with service plans that allow the subscribers (i) to engage in wireless communications (such as sending and receiving data messages) and (ii) to have a designated quantity of images printed per month (again, optionally allowing for additional prints at a designated overage charge).

The arrangement of FIG. 6 includes a radio access network (RAN) 60, which functions to provide a wireless access channel through which wireless subscriber devices can communicate with each other and/or with other entities on one or more transport networks. The example RAN 60 includes a base transceiver station (BTS) 62 that radiates to define one or more coverage areas (e.g., cells, cell sectors, etc.) in which subscriber devices can operate. The BTS 62 is then coupled with a base station controller (BSC) 64, which is in turn coupled with a mobile switching center (MSC) 66. The BSC 64 generally controls air interface communications, and the MSC 66 generally controls the RAN and provides connectivity with the public switched telephone network (PSTN) 68. FIG. 6 further illustrates an example wireless subscriber device 70, which is preferably a camera phone, operated by a user 72. Device 70 is in communication over an air interface 74 with the RAN 60 and particularly with BTS 62.

MSC 66 is also coupled with a signaling network 75, such as an out-of-band Signaling System #7 (SS7) network, which provides connectivity with a home location register (HLR) 76 and a service control point (SCP) 78. Conventionally, HLR 76 maintains subscriber profile data, such as service plan definitions, in a data store 80. Further, when a subscriber device such as device 70 registers in serving area of an MSC such as MSC 66, the HLR 76 conventionally transmits a copy of the subscriber's service profile data via signaling network 75 to the MSC, for storage in a visitor location register 82. The MSC may then reference that service profile data while serving the subscriber device.

SCP 78 is an advanced intelligent network control function, which also conventionally includes or has access to a data store 84 containing subscriber profile data. SCP 78 additionally includes various service logic modules, operable to produce service directives so as to assist in call processing. In practice, when MSC 66 receives an origination or termination request seeking to set up a communication to or from device 70, MSC 66 may pause processing of the request and send a query to SCP 78 via the signaling network 75, seeking guidance. Based on the service profile of device 70, SCP 78 may then apply its service logic to establish a service directive, such as a directive to allow the requested communication, to block the requested communication, or to modify the communication in some way (e.g., to redirect it). SCP 78 may then send the service directive to MSC 66 in a response message, and MSC 66 may carry out the directive.

With this basic arrangement, device 70 can place and receive telephone calls via PSTN 68. For instance, to place an outgoing call to a remote telephone device, device 70 can send a call origination message over the air to RAN 60. After possibly querying SCP 78 and obtaining a response directive, MSC 66 may then set up the call for device 70 over PSTN 68 to the called party. Similarly, when MSC 66 receives a request to connect an incoming call to device 70, MSC may page device 70 over the air and, when user 72 answers, may connect the call through to device 70.

FIG. 6 further illustrates RAN 60 providing a connection with a packet-switched network 86, so as to enable device 70 to engage in packet-data communications. Network 86 can be a private and/or public packet-switched network. As illustrated, in a preferred embodiment, network 86 includes a core packet network 88 operated by the wireless carrier and, connected by a firewall 90 to the core packet network, a public packet network 92 such as the Internet. Conventionally, BSC 64 is connected with a packet data serving node (PDSN) 94, which is a network access server providing connectivity with network 86.

In order for device 70 to communicate on network 86, device 70 first acquires packet-data connectivity. In an exemplary arrangement compliant with the well known CDMA2000® protocol, for instance, to acquire packet-data connectivity, device 70 would first send a packet-data origination request over the air to RAN 60. When MSC 66 receives the origination request, MSC 66 would then pass the request back to BSC 64, which would forward the request along to PDSN 94. PDSN 94 and device 70 would then negotiate to establish a data link, such as a point-to-point protocol (PPP) session, and PDSN 94 or a mobile-IP home agent (not shown) would then assign an IP address to device 70 for use in communications on the network.

Situated as nodes on network 86 in the example arrangement are a wireless access gateway 96 and a photo management server 98. Gateway 96 generally functions as a proxy server through which packet data communications by wireless subscriber devices pass. The wireless carrier can force largely all of its subscribers' packet data traffic through gateway 96, by programming the subscriber devices to use the gateway as a proxy server and/or by programming PDSN 94 to pass all outgoing data traffic to the gateway.

In practice, as traffic passes through gateway 96, gateway 96 may operate on the traffic in various useful ways. By way of example, gateway 96 translate content being delivered to wireless subscriber devices, so as to put the content in a form suitable for delivery to small scale, handheld devices. Further, gateway 96 may function as an authorization point, to ensure that communications to or from wireless subscriber devices are authorized. For this purpose, gateway 96 may include or have access to a subscriber profile data store 100, which similarly includes subscriber profile data such as service plan definitions. Thus, when a communication for subscriber device 70 is attempted through gateway 96, gateway 96 may refer to the subscriber profile data for device 70 to determine whether the communication is authorized and thus whether to allow the communication to proceed.

Photo management server 98 is a server (or combination of servers) that generally functions to manage photos for subscribers. As such, photo management server 98 can perform various useful functions. By way of example, photo management server 98 may host an online photo album service for subscribers. After capturing photos with device 70, user 72 can direct device 70 to transmit the resulting image files via RAN 60 and packet-switched network 86 to photo management server 98, for storage in an online album. Thereafter, the user or other authorized people may conveniently browse though the photos from any networked computer.

As another example, photo management server 98 may host a photo messaging service that allows transmission of captured photos to one or more designated recipients. For instance, after capturing photos with device 70, user 72 may direct device 70 to transmit the resulting image files via RAN 60 and packet-switched network 86 to photo management server 98, together with a directive for the image files to be sent to a particular destination (such as a particular e-mail address or wireless subscriber device). The photo management server may then send the image files to the designated recipient as instructed. Alternatively, at some point after uploading photos to the server (for online storage, for instance), user 72 may interact with photo management server 98 to direct the server to send the previously-uploaded photos to a particular destination, and the server may responsively do so.

And as still another example, photo management server 98 may function as a hub for sending photos to photo processing labs for printing. For instance, after capturing photos with device 70, user 72 may direct device 70 to transmit the resulting image files via RAN 60 and packet-switched network 86 to photo management server 98, together with a directive for the image files to be sent to a particular photo processing lab (e.g., selected by user 72 from a menu of available photo processing labs). Alternatively, using well known location-analysis techniques, photo management server 98 or another entity may select a photo processing lab located closest to device 70. Photo management server 98 may then send the image files via network 86 to the selected photo processing lab for printing. The photo processing lab may then print the images and deliver the resulting prints (e.g., by mail or hand delivery) to the user.

To facilitate various subscriber-specific services, photo management server 98 will preferably include or have access to a subscriber profile store 102, which, like the other profile stores described above, may include subscriber profile data such as service plan definitions. Thus, for instance, when photo management server 98 receives a request from device 70 to store an image file online, photo management server 98 may query the subscriber profile store 102 to determine whether the subscriber service plan for device 70 allows for such storage.

FIG. 6 further depicts a service provisioning system 104 (e.g., based on Lucent's ACTIVIEW® system), which functions as a central repository of subscriber service plan data and also functions to distribute service plan data, in whole or part, to the various data stores described above. When a subscriber first signs up for service with the wireless carrier, the carrier will store the subscriber's service plan in service provisioning system 104, and service provisioning system 104 will then distribute the service plan data, in whole or in part, to various data stores. Further, when the subscriber's plan changes in some way, updates will preferably be sent (from the entity that made the change) to service provisioning system 104, and service provisioning system 104 will preferably distribute modified versions of the profile data to the applicable data stores.

In accordance with the exemplary embodiment, device 70 and/or user 72 will have a CSIP service plan that defines quantities of communication service and image-printing allowed per month, as described above. By way of example, the service plan may indicate that device 70 is permitted to (i) engage in an unlimited quantity of voice calling (with overage charges for use of more than a certain number of minutes of calling), (ii) engage in an unlimited quantity of data communication per month, (iii) send an unlimited number of images via photo management server 98 per month, and (iv) have up to 20 images printed at participating photo processing labs per month, all for a base fee per month of $40.00.

In practice, when this CSIP plan is established (or modified in some manner), it will thus be stored in service provisioning system 104. Service provisioning system 104 will, in turn, programmatically distribute the CSIP plan data, as applicable, to entities such as HLR 76 (for storage in profile store 80), SCP 78 (for storage in profile store 84), gateway 96 (for storage in profile store 100), and photo management server 98 (for storage in profile store 102).

Some of these profile stores may have a need for only a portion of the subscriber's CSIP plan data, and so service provisioning system 104 may send just the necessary portion of the CSIP plan data to those profile stores. In a preferred embodiment, for instance, photo management server 98 will function as the core manager of image-printing allowances, so service provisioning system 104 may provide just photo management server 98 with the CSIP plan data that indicates how many image-prints the subscriber is allowed to obtain per month.

As device 70 seeks to engage in communication service, various elements of FIG. 6 may reference the device's CSIP plan data in order to determine whether to allow the communication service, i.e., whether to authorize the communication service, in line with the above discussion of FIG. 2.

By way of example, when device 70 seeks to place a telephone call via PSTN 68, MSC 66 may refer to the CSIP plan data stored in VLR 82 and thereby determine that device 70 has voice calling service, and so MSC 66 may allow the call to proceed. (Further, MSC 66 may generate a billing record for the call and send the record to an accounting system (not shown).) As another example, when device 70 seeks to engage in data communication via gateway 96, gateway 96 may refer to the CSIPO plan data stored in profile store 100 and thereby determine that device 70 is entitled to engage in unlimited data service, and so gateway 96 may allow the communication to proceed. And as yet another example, when device 70 seeks to send an image via photo management server 98 to a particular e-mail recipient, photo management server 98 may refer to the CSIP plan data stored in profile store 102 and thereby determine that device 70 is entitled to engage in unlimited photo messaging, and so photo management server 98 may allow the image to be sent.

Similarly, when device 70 seeks to have one or more images printed, photo management server 98 will reference the device's CSIP plan data in profile store 102 to determine whether the device has a sufficient number of unused image-printing allowances remaining in the current monthly billing cycle, and photo management server 98 will allow the image (s) to be printed only if a sufficient number of unused image-printing allowances remain. (As noted above, in an alternative embodiment, the device could be allowed to have more than a base allowed number images printed, for a designated overage charge.)

For this purpose, photo management server 98 will preferably maintain in the device's CSIP plan record a field that indicates the number of unused image-printing allowances that remain, refreshing the count at the beginning of each monthly billing cycle. Thus, for instance, if the device begins with 20 image-printing allowances and has 6 images printed, the photo management server will decrement the count of remaining image-printing allowances to 14, and so forth.

FIG. 6 depicts four example photo processing labs 106, 108, 110, 112, to help illustrate this process in further detail, commensurate with the arrangements discussed above with reference to FIGS. 3, 4 and 5.

In a first process, commensurate with FIG. 3, user 72 employs device 70 to send one or more image files via RAN 60 and packet-switched network 86 to photo management server, with a request to have the images printed at a particular photo processing lab 106. Device 70 may, for instance, include a photo management client application that engages in HTTP communication with photo management server 98 to present user 72 with a menu of photo processing labs from which user 72 can chose a desired photo processing lab. Further, the photo management client application may allow the user to select one or more images to upload for transmission to the photo processing lab for printing. Once the user makes these selections, device 70 may thus send the image file(s) via RAN 60 and network 86 to photo management server 98. The device may send the image file(s) in an HTTP POST message, also providing the photo management server 98 with (i) a subscriber ID (e.g., an NAI) that can be used as a key to reference the device's service plan data and (ii) an indication of the selected photo processing lab 106, in HTTP header fields for instance.

In accordance with the exemplary embodiment, photo management server 98 will then refer to the device's CSIP plan data in profile store 102, to determine how many unused image-printing allowances remain for the device in the current month, and to determine whether the number of remaining image-printing allowances is sufficient to cover the number of image prints requested. Assuming a sufficient number of unused image-printing allowances remain, photo management server 98 may then transmit the image file(s) along to photo processing lab 106 (again by HTTP POST, for instance), preferably together with an authentication token such as an encrypted codeword as described above. Photo processing lab 106 may then print the image(s) as requested and deliver the image print(s) to user 72. Further, photo management server may decrement the count of unused image-printing allowances in the device's CSIP plan accordingly.

In a second process, commensurate with FIG. 4, the user 72' shown at the bottom center of FIG. 6 presents one or more image files to photo processing lab 110 with or without communicating the files through the wireless carrier's network. For instance, user 72' may visit a brick and mortar facility of the photo processing lab 110 and/or a photo processing kiosk associated with the photo processing lab 110, and the user may convey the desired image files through short-range wireless transmission (e.g., BLUETOOTH), or by memory card insertion, cable connection, or in some other way, to the photo processing lab 110. In addition, the user will preferably provide the photo processing lab with the user's subscriber ID (and password, if applicable), such as through keypad entry for instance.

When the photo processing lab 110 receives the user's request to print these one or more images, the photo processing lab will then engage in signaling communication with photo management server 98 via network 86, in order to determine whether to grant the user's image-printing request. For example, the photo processing lab 110 may send an HTTP request message to photo management server 98, indicating in the message (i) the supplied subscriber ID (and password, if applicable) and (ii) the number of image prints requested. In turn, the photo management server 98 may then query the CSIP plan data in profile store 102 to determine whether the number of remaining image-printing allowances is sufficient to cover the number of requested image prints. If so, the photo management server 98 may then send a positive authorization response (e.g., in an HTTP 200 OK message) to the photo processing lab 110. Photo processing lab 110 may then print and deliver the image(s) as requested, and photo management server 98 may decrement the count of unused image-printing allowances accordingly.

In a final example process, commensurate with FIG. 5, the user 72 operates device 70 at photo processing lab 112 to convey an image-printing request, e.g., to provide photo processing lab 112 with one or more image files to print. For instance, device 70 may transmit the image file(s) and image-printing request, over a short-range wireless connection, to a kiosk associated with the photo processing lab 112.

In this arrangement, before, during, or after transmitting the image-printing request to the photo processing lab 112, device 70 will itself engage in signaling communication with photo management server 98 to obtain authorization for the requested image print(s). For example, device 70 may send an HTTP request message to photo management server, providing the photo management server with an indication of the number of image prints requested. (The request coming via RAN 60 may inherently authenticate the requestor and include an applicable subscriber ID; alternatively, the device 70 may include in the request to photo management server 98 a subscriber ID (and password, if applicable)).

Photo management server 98 will then refer to the device's CSIP plan data in profile store 102 to determine whether the number of unused image-printing allowances for the current month is sufficient to cover the requested number of image prints. If so, the photo management server 98 may return to the device 70, in an HTTP response message for instance, a positive authorization response together with an authentication token as described above. Device 70 may then convey the authentication token, also by short-range wireless transmission for instance, to the photo processing lab 112. The photo processing lab 112 may then use the token as a basis to conclude that the requested image print(s) are authorized, and the photo processing lab may thus print and deliver the image(s) as requested. In addition, again, the photo management server 98 may decrement the count of remaining image-printing allowances for the device in the CSIP plan.

In some embodiments, the photo processing lab that performs the image-printing function may be owned and operated by the wireless carrier that collects subscriber payment for the CSIP plan. In that case, there may be no need to reconcile payment between the photo processing lab and the wireless carrier. In other embodiments, however, the photo processing lab may be a third party service, not provided by the wireless carrier. In that case, there may be a need for payment reconciliation. To facilitate payment reconciliation in a preferred embodiment, the photo processing lab may maintain a record of images printed with wireless carrier authorization, e.g., with authorization coming from photo management server 98, and the photo processing lab may periodically collect from the wireless carrier a share of subscribers' payments for the image prints.

Further, as noted above, it is possible that CSIP plans can be limited to allow image-printing at just participating photo processing labs. Preferably, each photo processing lab (if not owned and/or operated by the wireless carrier) will enter into an agreement in advance with the wireless carrier, through which the carrier will agree to collect subscriber payment and to share a portion of the payment with the photo processing lab.

Further, the carrier may limit participation to just certain photo processing labs, such as only a photo processing lab associated with the vendor from which the subscriber bought the digital camera used to capture the image or used to convey the image to the photo processing lab for printing. To accomplish this, the carrier can maintain a record in each subscriber's CSIP indicating the vendor of the digital camera at issue, and/or indicating one or more photo processing labs associated with (e.g., located at premises of) the vendor. When faced with a request to authorize image-printing for the subscriber at a particular photo processing lab, the carrier may then determine if the photo processing lab is associated with the digital camera vendor and may authorize the image-printing only if so.

Finally, it should be understood that the various functions described above can be carried out by suitably arranged software, firmware and/or hardware logic. By way of example, each of the various network elements shown can include one or more processors, data storage, and program instructions stored in the data storage and executable by the one or more processors to carry out the various functions described.

An exemplary embodiment of the present invention has thus been described above. Those skilled in the art will understand, however, that changes and modifications may be made to this embodiment without departing from the true scope and spirit of the present invention, which is defined by the claims.

What is claimed is:

1. At a node in a communication path between a wireless communication device and a photo processing lab, a method comprising:
   receiving a communication that is in transit from the wireless communication device to the photo processing lab, the communication defining an image-printing request that requests printing of one or more images;
   responsive to receiving the communication, the node making a determination, based on a subscriber service plan for the wireless communication device, of whether (i) the communication is authorized and (ii) the requested image printing is authorized;
   if the determination is that the communication is authorized and that the requested image printing is authorized, then the node sending the image-printing request along the communication path to the photo processing lab; and
   if the determination is that the communication is not authorized or that the requested image printing is not authorized, then the node not sending the image-printing request to the photo processing lab.

2. The method of claim 1, further comprising if the determination is that the communication is authorized and that the requested image printing is authorized, including with the image-printing request an authorization token to indicate to the image processing lab that the image-printing request is authorized.

3. The method of claim 2, further comprising the node generating the authorization token.

4. The method of claim 2, wherein the authorization token comprises an encrypted code.

5. The method of claim 1, wherein the node includes data storage that contains at least a portion of the subscriber service plan.

6. The method of claim 1, wherein making the determination, based on the subscriber service plan for the wireless communication device, of whether the requested image printing is authorized comprises making a determination, based on the subscriber service plan for the wireless communication device, of whether a sufficient number of unused image-printing allowances remain for the subscriber.

7. The method of claim 1, wherein the image printing request comprises one or more image files defining the one more images.

8. The method of claim 1, wherein the communication is an HTTP POST message.

9. The method of claim 1 further comprising, if the determination is that the communication is authorized and that the requested image printing is authorized, then the node updating the subscriber service plan to indicate a number of remaining image prints.

10. The method of claim 1, wherein the subscriber service plan indicates at least one participating photo processing lab, and
   wherein the node making a determination, based on the subscriber service plan for the wireless communication device, of whether the communication is authorized and the requested image printing is authorized comprises the node making a determination, based on the subscriber service plan for the wireless communication device, of whether (i) the communication is authorized, (ii) the requested image printing is authorized, and (iii) the photo processing lab is one of the at least one participating photo processing lab, and
   wherein the node does not send the image printing request along the communication path to the photo processing lab unless the determination is that the communication is authorized and that the requested image printing is authorized and that the photo processing lab is one of the at least one participating photo processing labs.

11. The method of claim 1, wherein the communication path between the wireless communication device and the photo processing lab comprises a short-range wireless network between a wireless communication device and a photo processing kiosk.

12. At a node in a communication path between a wireless communication device and a photo processing lab, a method comprising:
   receiving a communication that is in transit from the wireless communication device to the photo processing lab, the communication defining an image-printing request that requests printing of one or more images;
   responsive to receiving the communication, the node making a first determination, based on a subscriber service plan for the wireless communication device, of whether the communication is authorized;
   if the first determination is that the communication is authorized, then the node making a second determination, based on the subscriber service plan for the wireless communication device, of whether the requested image printing is authorized;
   if the second determination is that the requested image printing is authorized, then the node sending the image-printing request along the communication path to the photo processing lab; and
   if the first determination is that the communication is not authorized or if the second determination is that the requested image printing is not authorized, then the node not sending the image-printing request to the photo processing lab.

13. The method of claim 12, further comprising if the second determination is that the requested image printing is authorized, including with the image-printing request an authorization token to indicate to the image processing lab that the image-printing request is authorized.

14. The method of claim 13, further comprising the node generating the authorization token.

15. The method of claim 13, wherein the authorization token comprises an encrypted code.

16. The method of claim 12, wherein the node includes data storage that contains at least a portion of the subscriber service plan.

17. The method of claim 12, wherein making the second determination, based on the subscriber service plan for the wireless communication device, of whether the requested image printing is authorized comprises making a second determination, based on the subscriber service plan for the wireless communication device, of whether a sufficient number of unused image-printing allowances remain for the subscriber.

18. The method of claim 12, wherein the image printing request comprises one or more image files defining the one more images.

19. The method of claim 12, wherein the communication is an HTTP POST message.

20. The method of claim 12 further comprising, if the second determination is that the requested image printing is authorized, then the node updating the subscriber service plan to indicate a number of remaining image prints.

21. The method of claim 12, wherein the subscriber service plan indicates at least one participating photo processing lab; the method further comprising,
  the node making a third determination, based on the subscriber service plan for the wireless communication device, of whether the photo processing lab is one of the at least one participating photo processing labs, and
  wherein the node does not send the image printing request along the communication path to the photo processing lab unless the first determination is that the communication is authorized and the second determination is that the requested image printing is authorized and the third determination is that the photo processing lab is one of the at least one participating photo processing labs.

22. The method of claim 12, wherein the communication path between the wireless communication device and the photo processing lab comprises a short-range wireless network between a wireless communication device and a photo processing kiosk.

* * * * *